June 25, 1963 — R. T. EGAN — 3,095,289
GAS CLEANING APPARATUS
Filed Sept. 2, 1960 — 3 Sheets-Sheet 1
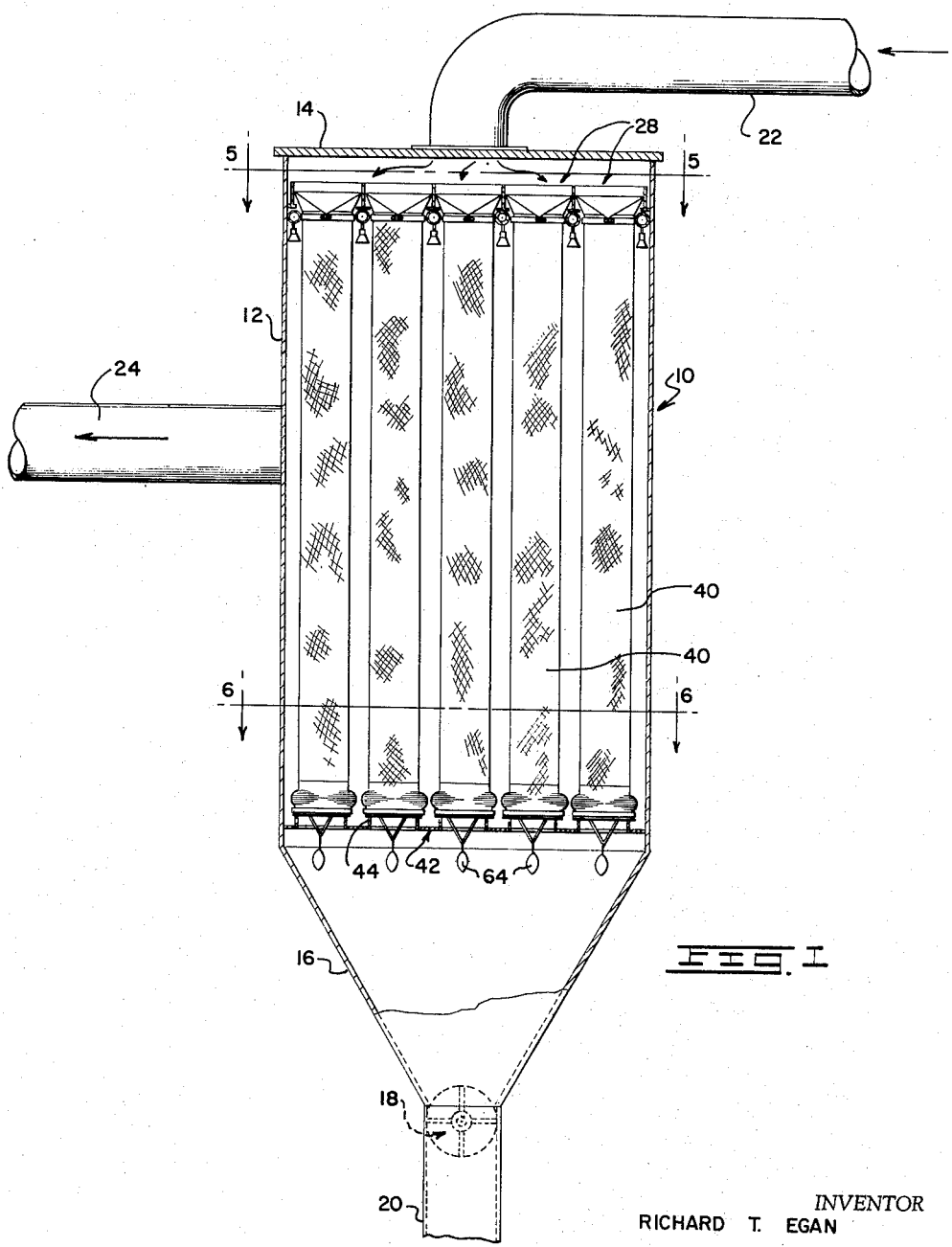
INVENTOR
RICHARD T. EGAN
BY Stowell & Stowell
ATTORNEYS June 25, 1963
R. T. EGAN
3,095,289
GAS CLEANING APPARATUS
Filed Sept. 2, 1960
3 Sheets-Sheet 2
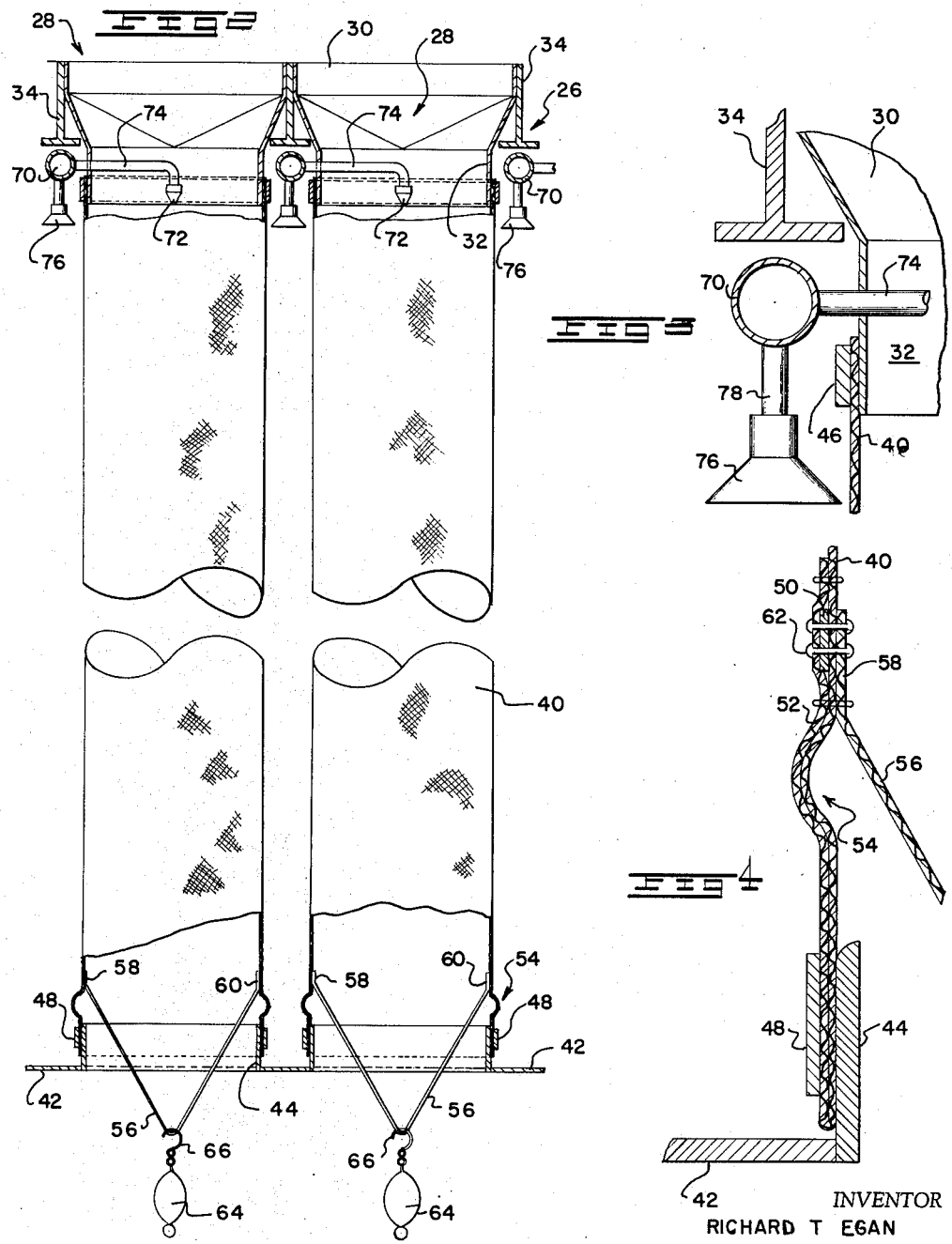
INVENTOR
RICHARD T EGAN
BY Stowell & Stowell
ATTORNEYS

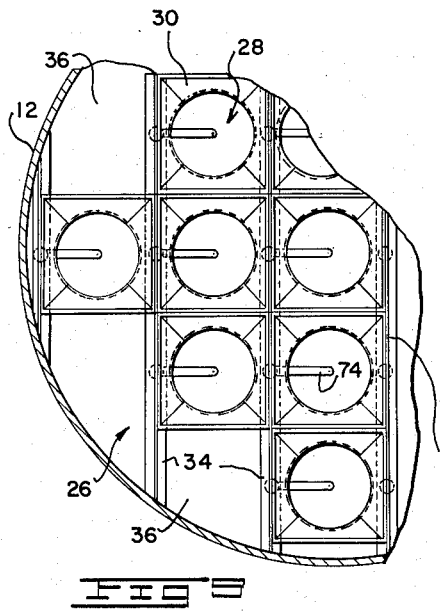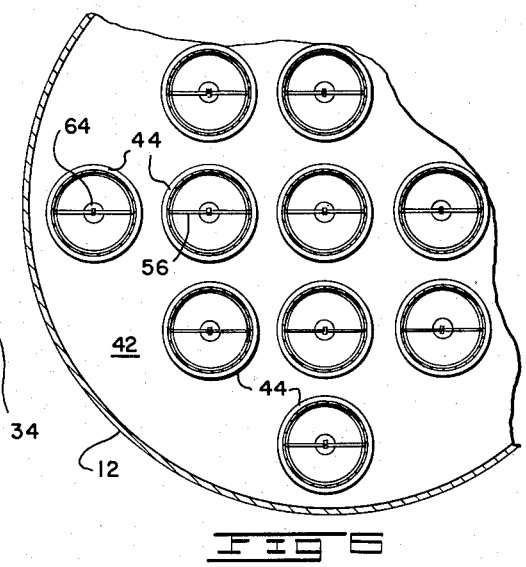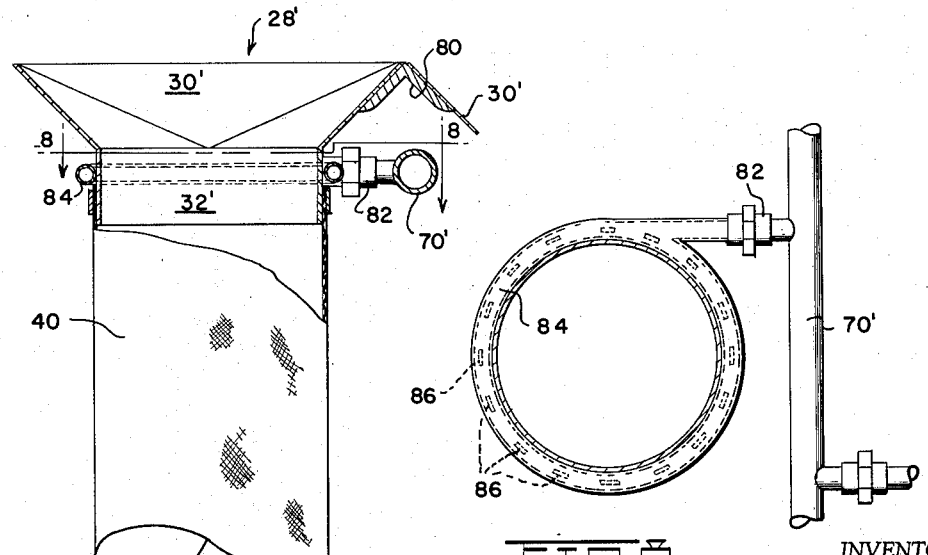

United States Patent Office 3,095,289
Patented June 25, 1963

3,095,289
GAS CLEANING APPARATUS
Richard T. Egan, Basking Ridge, N.J., assignor to Research-Cottrell, Inc., Bridgewater Township, N.J., a corporation of New Jersey
Filed Sept. 2, 1960, Ser. No. 53,726
1 Claim. (Cl. 55—293)

This invention relates to gas cleaning apparatus and, in particular, to improvements in gas cleaning apparatus of the bag filter type.

In the general application of tubular fabric filters to the collection of particulate matter from gas, the filtering elements are arranged in a plurality of vertical rows and the gas to be cleaned is introduced within the inner confines of the filter bags and the dirty gas passing through the filter bags deposits suspended particulate material on the inner surface of each of the filter bags. Periodically the tubular filter bags are vibrated whereby the particulate material bed or cake is dislodged from the inner surface of the filter bags by induced flexure of the media causing the agglomerated particles to fall into a collection hopper.

It is a principal object of the present invention to provide improved bag type gas cleaning apparatus of the type described having high fabric to air ratios and relatively uniform bed porosity and pressure differentials.

A further object is to provide such as device wherein constant uniform tension on the filter bag structures is maintained regardless of temperature fluctuations within the system.

A further object is to provide a particularly flexible section in each of the bag filter devices to insure free movement of the bags by an induced flexure thereof to improve the release of agglomerated particulate material from the walls thereof.

Another object is to provide such a structure including gas operated means for flexing the filter bag structures during operation to permit continuous or intermittent cleaning thereof.

A further object is to provide a bag type gas cleaning apparatus wherein the primary gas flow and particulate material fall is in the same direction permitting in-service cleaning of the bags.

These and other objects and advantages are provided in gas cleaning apparatus including a housing having a dirty gas inlet and a clean gas outlet, a header plate structure supported within the housing between the gas inlet and the gas outlet, a collected material receiving hopper at the lower end of the housing, a partition member supported within the housing and separating the gas inlet and the gas outlet from the material receiving hopper, means defining a plurality of opposed pairs of openings through the header plate structure and the partition member, a gas permeable flexible filter bag supported at one end about each opening in the header plate structure and received at the other end about the complementary opposed opening in the partition member, flexible draft means for each bag having opposite ends secured to radially spaced points of its bag, a weight means suspended from each of the flexible draft means, and means for flexing said gas permeable flexible filter bags.

The invention will be more particularly described and other objects and advantages will become more apparent to those skilled in the art from the following detailed description of the invention and the accompanying drawings wherein:

FIG. 1 is an elevational view in partial section of a bag type gas cleaning apparatus constructed in accordance with the teachings of the invention;

FIG. 2 is an enlarged fragmentary view in partial section of a pair of the bag filters of the apparatus illustrated in FIG. 1;

FIG. 3 is an enlarged fragmentary sectional view of the means suspending the upper end of the bags to the header means;

FIG. 4 is an enlarged fragmentary sectional view of the means securing the lower end of the bags to the lower partition member and the means supporting flexible tapes to radially spaced points of the bags;

FIG. 5 is an enlarged fragmentary sectional view substantially on line 5—5 of FIG. 1;

FIG. 6 is an enlarged fragmentary sectional view substantially on line 6—6 of FIG. 1;

FIG. 7 is a fragmentary view in partial section of a modified form of the present invention showing improved means for flexing the filter bags to remove the particulate material agglomerated thereon; and FIG. 8 is a sectional view substantially on line 8—8 of FIG. 7.

Referring to the drawings and, in particular, to FIGS. 1 through 6, 10 generally designates the improved gas cleaning structure of the invention. The improved gas cleaning device 10 includes a housing or shell 12 which in the illustrated form of the invention is cylindrical in form and has a top 14 and a generally conical base 16 forming a storage hopper for agglomerated material. The lower end of the conical base 16 communicates, through a gas lock type star valve 18, with an outlet pipe 20 for collected material.

A dirty gas inlet pipe 22 enters the housing through an opening in the top 14 and the clean gas leaves the apparatus through an outlet duct 24 which communicates with the interior of the cylindrical shell 12.

Adjacent the upper end of the cylindrical shell 12 is provided a header plate assembly generally designated 26 which is more clearly illustrated in FIGS. 2, 3, and 5. The header plate assembly includes a plurality of pipe sections 28 having generally square upper ends 30 and cylindrical lower ends 32. Rows of the pipe structures 28 are supported and interconnected one to the other by generally inverted T-shaped structural members 34 and the space between the cylindrical walls of the housing 12 and the pipe sections 28 are filled by sheet members 36.

The pipe sections 28, the structural members 34 and the sheet members 36, together define a header plate assembly and provide the openings through the header structure and the support means for the plurality of tubular gas permeable flexible filter bags 40.

The hopper structure 16 is separated from the main portion of the cylindrical housing 12 by a partition plate 42 having a plurality of openings therein. Each of the openings in the partition plate is provided with a collar 44 which, as to be more fully described, provide communication between the interior of each of the bag filters 40 and the hopper for agglomerated material and provide a portion of the anchor means for the lower ends of each of the bag filters. The collars 44 surrounding the plurality of openings in the lower partition member 42 are positioned in opposed relationship to complementary openings provided by the pipe structures 28 forming a portion of the upper header plate assembly 26.

The cylindrical ends of the pipe structures 28 are of a diameter to be received snugly in the upper ends of the filter bags 40. The bags 40 are secured about the cylindrical ends of the pipe sections 28 by conventional band members 46 which encircle the upper end of each of the bags and clamp the bags to the extended ends of the pipe sections 28.

The lower end of each bag is slipped over its collar 44 and a further band 48 encircling the lower end of each of the bags 40 clamps the bags to their respective collars 44. As more clearly shown in FIG. 4 of the drawings, the lower ends of the bags are preferably turned upwardly to provide a double walled portion adjacent their lower ends. Adjacent the upper extremity of the turned up portion of each of the bags is preferably provided a stiffening band generally designated 50 which stiffening band is sewn between the wall of the filter bag and the turned-up portion 52. Also, as more clearly illustrated in FIGS. 2 and 4, the length of the bags 40 and the distance between the lower partition member 42 and the upper header plate structures 26 is so selected that with the bags in the installed position, a slack portion 54 is provided to compensate for temperature expansion of the housing or shell and, in addition, to provide a flexible joint for freer movement of the bags.

Each of the filter bags 40 is maintained at a substantially constant predetermined tension by attaching to each bag a suitable weight structure. Referring particularly to FIGS. 2 and 4, the weight tensioning means of the invention includes at least one flexible band, strap or the like 56. The extended ends 58 and 60 of each of the flexible bands 56 is sewn, riveted or otherwise attached to the inner lower wall of its respective bag at radially spaced points. In the illustrated form of the invention, the ends 58 and 60 of the flexible tapes 56 are secured to the bags adjacent the stiffening bands 50 by rivet means 62 and the ends 58 and 60 are radially displaced 180°.

To each flexible tape 56 is mounted a weight 64 by a simple hook structure 66 or the like. The length of the flexible tapes 56 is preferably so selected that the weight members 64 hang below the openings in the lower partition member 42 whereby the weights may be placed on the units from an inspection opening in the hopper structure. Further, as illustrated in the drawings, by attaching the tapes 56 to the bag filters where the stiffening bands 50 are positioned, more uniform tension is maintained in each of the bags above the bands 50.

To dislodge the agglomerated aerosol from the interior surface of the bags, bag flexing means are included in the improved bag filter structure. In the form of the invention shown in FIGS. 1 through 6, compressed air is employed as the bag flexing means to remove the agglomerated collected particulate material. The compressed air bag flexing means includes a plurality of conduits 70 which pass between the rows of bags below the structural members 34. Each of the bag filters is provided with a substantially centrally disposed compressed air nozzle 72 which nozzles are connected by ducts 74 to one of the compressed air conduits 70. The nozzle in each of the bags directs a blast of compressed air to the interior of its bag and serves as a means for flexing the bags to effect cleaning thereof. The blast of compressed air also aids in the gravity fall of the dislodged material into the hopper 60 below the partition plate 42.

Associated with each bag or group of bags is an external compressed air nozzle 76. The nozzles 76 are connected by ducts 78 to the compressed air conduits 70 whereby simultaneously with the directing of compressed air to the interior of each of the bags a blast of compressed air is also directed downwardly along the exterior surface of each of the bags.

By means of a conventional cycling device, not shown, air jet nozzles 72 and 76 set up ripples or wave action in all or certain of the bag filters flexing the cloth and dislodging the collected particulate material. Since at any given point in the filter bag structures, there is a downward motion to the gas, the dislodged, agglomerated particles are conveniently conveyed to the storage hopper. With this arrangement, the problems of re-entrainment of collected material associated with, for example, up-flow filters, is substantially eliminated.

In operation of the improved bag filter illustrated in FIGS. 1 through 6, contaminated gas from a source of dirty gas is introduced into the gas cleaning device adjacent its upper end through conduit 22. The dirty gas entering the cylindrical housing 12 flows to the plurality of openings formed in the upper header plate structure by the tubular members 28. The gas stream entering the tubular members 28 flows into the top of the respective bag filters conveying particulate material downward toward the collection hopper 16 until permeation of the carrier gas stream through the filter causes the deposition of the suspended particulate material along the inner walls of the bag filters. As hereinbefore discussed, at predetermined intervals, compressed air is directed to the nozzles 72 and 76 setting up traveling waves in the suspended filter bags and dislodging the collected cake which is carried downwardly into the collection hopper.

The cleaning cycle for the bags may be adjusted so that only certain of the bags are cleaned at the same moment whereby there is substantially little reduction in overall capacity of the filter device at any given moment. It will also be appreciated that adjustment or regulation of the cycling of the air jets 72 and 76 may be automatically controlled for a particular operating pressure differential across all of the bag filters or the individual bag to be cleaned.

In FIGS. 7 and 8, a modified form of the upper header structure and support and a modified form of jet air cleaning means for the bags is illustrated. The modified header plate structure includes a plurality of pipe sections 28' having cylindrical lower ends 32' and, for example, quadrangular upper ends 30'. Adjacent edges of the quadrangular portions 30' of each of the pipe sections 28' are supported by and secured to inverted V-shaped angle irons 80 extending between the rows of gas cleaning devices. Where cylindrical housing structures are provided for the plurality of gas cleaning units and quadrangular pipe sections are employed, the space between the outer units and the inner peripheral wall of the housing is filled by plate members as illustrated at 36 in the form of the invention shown in FIGS. 1 through 6.

In the modified form of the invention illustrated in FIGS. 7 and 8, flexing of each of the filter bags is by compressed air from conduits 70' extending below the support irons 80. Compressed air from the conduits 70' is directed by pipes 82 to the plurality of annular compressed air distributing tubes 84. Each of the filter units is provided with at least one annular tube structure 84 preferably positioned about the upper end of the bag. The annular compressed air distributing means are provided with a plurality of openings 86 which direct the compressed air downwardly against the outer surface of the bags 40 causing gentle flexing of the woven structures and effectively dislodging agglomerated particulate material collected on the interior walls thereof.

The annular tube type bag flexing means may be used in conjunction with the compressed air nozzles 72 shown in FIGS. 1–6 for directing streams of compressed air into the interior of the bag filters or the annular compressed air distributing means may be employed as the only bag flexing means.

From the foregoing detailed description of the improvements comprising the present invention, it will be apparent to those skilled in the art that various modifications may be made in the form of the specific structures illustrated in the drawings without departing from the scope of the invention as defined in the appended claim.

I claim:

Gas cleaning apparatus comprising a housing having a dirty gas inlet and a clean gas outlet, header means supported within the housing between the gas inlet and the gas outlet, a collected material receiving hopper at the lower end of the housing, a partition member supported within the housing and separating the gas inlet and the gas outlet from the material receiving hopper, means defining a plurality of complementary opposed openings through the header plate means and the partition member, a plurality of gas permeable flexible filter bags, each of said filter bags having a length greater than the distance between the header means and the partition member, means supporting each of said bags at one end about each opening in the header means, means mounting the other end of each of said bags about the complementary opposed opening in the partition member, means for tensioning each of the bags comprising an elongated, relatively narrow flexible draft member for each bag having opposite ends secured to radially opposite points adjacent the lower end of each bag above the zone of connection between each bag and its opening in the partition member, a stiffening band encircling each bag adjacent the points of attachment of the flexible draft member to the bags, a weight member suspended from each of the flexible draft members, and pneumatic means for periodically flexing each of the gas permeable filter bags, whereby material collected on the interior surface thereof will be dislodged and fall past the respective flexible draft members and into said hopper.

References Cited in the file of this patent

UNITED STATES PATENTS

| | | |
|---|---|---|
| 1,321,490 | Sweetland | Nov. 11, 1919 |
| 1,349,480 | Wilsmore | Aug. 10, 1920 |
| 1,498,061 | Adams | June 17, 1924 |
| 2,769,506 | Abboud | Nov. 6, 1956 |

FOREIGN PATENTS

| | | |
|---|---|---|
| 230,464 | Great Britain | May 27, 1926 |
| 401,186 | Germany | Aug. 29, 1924 |
| 488,129 | Great Britain | July 1, 1938 |
| 767,220 | Great Britain | Jan. 30, 1957 |
| 796,414 | Great Britain | June 11, 1958 |
| 812,244 | Great Britain | Apr. 22, 1959 |